US005500200A

United States Patent [19]
Mandeville et al.

[11] Patent Number: 5,500,200
[45] Date of Patent: Mar. 19, 1996

[54] FIBRILS

[75] Inventors: W. Harry Mandeville, Lynnfield; Larry K. Truesdale, N. Andover, both of Mass.; Howard Tennent, Kennett Square, Pa.

[73] Assignee: Hyperion Catalysis International, Inc., Cambridge, Mass.

[21] Appl. No.: 479,864

[22] Filed: Jun. 7, 1995

Related U.S. Application Data

[63] Continuation of Ser. No. 284,755, Aug. 2, 1994, abandoned, which is a continuation of Ser. No. 746,065, Aug. 12, 1991, abandoned, which is a continuation of Ser. No. 285,817, Dec. 16, 1988, abandoned, which is a continuation-in-part of Ser. No. 149,573, Jan. 28, 1988, abandoned, which is a continuation-in-part of Ser. No. 872,215, Jun. 6, 1986, abandoned, and a continuation-in-part of Ser. No. 871,675, Jun. 6, 1986, abandoned, and a continuation-in-part of Ser. No. 871,676, Jun. 6, 1986, abandoned, which is a continuation-in-part of Ser. No. 678,701, Dec. 6, 1984, Pat. No. 4,663,230.

[51] Int. Cl.$^6$ .................................................. C01B 11/04
[52] U.S. Cl. ...................... 423/447.3; 423/450; 423/453; 423/458
[58] Field of Search .................. 423/447.3, 449, 423/450, 453, 458, DIG. 18

[56] References Cited

U.S. PATENT DOCUMENTS

| | | | |
|---|---|---|---|
| 4,014,980 | 3/1977 | Fujimaki et al. | 423/450 |
| 4,435,376 | 3/1984 | Porter et al. | 423/447.3 |
| 4,650,657 | 3/1987 | Brooks | 423/447.3 |
| 4,663,230 | 5/1987 | Tennent et al. | 428/367 |
| 4,710,483 | 12/1987 | Burk et al. | 502/185 |
| 4,767,737 | 8/1988 | Brooks | 423/459 |
| 4,816,289 | 3/1989 | Komatsu et al. | 423/447.3 |

FOREIGN PATENT DOCUMENTS

| | | | |
|---|---|---|---|
| 0198558 | 11/1986 | European Pat. Off. | 423/450 |
| 55-118913 | 9/1981 | Japan | 423/447.3 |
| 57-117622 | 7/1982 | Japan | 423/447.3 |
| 58-966 | 10/1983 | Japan | 423/453 |
| 60-231821 | 11/1985 | Japan | 423/447.3 |
| 61-132600 | 6/1986 | Japan | 423/447.3 |
| 8701317 | 2/1987 | WIPO | 428/367 |

OTHER PUBLICATIONS

Oberlin, "Filamentous Growth of Carbon Through Benzene Decomposition", Journal of Crystal Growth, vol. 32 (1976) pp. 335–349.

Baker et al., "Formation of Filamentous Carbon From Iron, Cobalt, and Chromium Catalyzed Decomposition of Acetylene", Journal of Catalysts, 30 (1973) pp. 86–95.

Primary Examiner—Robert Kunemund
Attorney, Agent, or Firm—Curtis, Morris & Safford; Barry Evans

[57] ABSTRACT

This invention relates to fibrils. It more particularly refers to carbon/graphite fibrils and to an improved process for producing such. Carbon fibrils as used herein means graphitic fibrils having high surface area, high Young's modulus of elasticity and high tensile strength which are grown catalytically from available sources of carbon.

23 Claims, No Drawings

FIBRILS

This application is a continuation application under 37 CFR §1.62 of prior application Ser. No. 08/284,755, filed on Aug. 2, 1994, now abandoned which is a continuation of application Ser. No. 07/746,065, filed on Aug. 12, 1991, now abandoned which is a continuation of application Ser. No. 07/285,817, filed on Dec. 16, 1988, now abandoned, which is a continuation-in-part of application Ser. No. 07/149,573, filed on Jan. 28, 1988, now abandoned, which is a continuation-in-part of application Ser. No. 06/872,215, filed on Jun. 6, 1986, now abandoned; application Ser. No. 06/871,675, filed on Jun. 6, 1986, now abandoned; and application Ser. No. 06/871,676, filed on Jun. 6, 1986, now abandoned; which is a continuation-in-part of application Ser. No. 06/678,701, filed on Dec. 6, 1984, now U.S. Pat. No. 4,663,230.

This invention relates to fibrils. It more particularly refers to carbon/graphite fibrils and to an improved process for producing such. Carbon fibrils as used herein means graphitic fibrils having high surface area, high Young's modulus of elasticity and high tensile strength which are grown catalytically from available sources of carbon.

BACKGROUND OF THE INVENTION

It has been known for some time that one could make fibrils by decomposing various carbon contributing molecules, such as light hydrocarbons, in contact with a suitable metal catalyst, such as for example iron alone or in combination with other metals.

SUMMARY OF THE INVENTION

Fibrils are made according to this invention in a high temperature, catalytic process. The Fibril can be made of a variety of materials, e.g. carbon, silicon nitride, silicon carbide, etc. In one important embodiment, such fibrils have the atoms in their composition relatively ordered at their outer surfaces as they are made by this process. Thus, it can be said that this process preferably directly produces a product having a relatively crystalline outer region for substantial portions of its length and may have inner regions where its atoms are less ordered. It may, and often does, even have a hollow region axially positioned along substantial portions of its length.

Fibrils according to this invention are characterized by small diameters, e.g. about 3.5 to 70 nanometers and high L/D up to about 100 and even more. Where the preferred structure described above is produced, it is suitably produced directly in the fibril forming process without further processing being required.

Where the fibrils of this invention are to be made of carbon, such can be produced in quite high yields. In this embodiment, a suitable source of carbon may be a hydrocarbonaceous material illustrated by: methane, ethane, propane, butane, benzene, cyclohexane, butene, isobutene, ethylene, propylene, acetylene, toluene, xylene, cumene, ethyl benzene, naphthalene, phenanthrene, anthracene, formaldehyde, acetaldehyde, acetone, methanol, ethanol, carbon monoxide (a non-hydrocarbonaceous material), other similar materials, and mixtures of two (2) or more thereof. Such feed is contacted with a suitable, catalyst at elevated, fibril forming temperatures for a time sufficient to cause graphitic carbon fibrils to grow.

It is within the scope of this invention to provide a non-hydrocarbonaceous gas along with the carbon contributing reactant. Such gas might for example be hydrogen or carbon monoxide. Inert diluents are also suitable.

The temperature of the process of this invention can vary widely depending upon the nature of the carbon source being used, however, for best results, it should be kept below the thermal decomposition temperature thereof. In the case of using a mixture of such carbon sources, the operating temperature should be maintained below the thermal decomposition temperature of the most temperature-sensitive carbon source in the system. Temperatures in the range of 500° to 1500° C. may be found to be generally usable, depending on the carbon source used, preferably between about 600° and 900° C.

Subatmospheric, atmospheric and/or super atmospheric pressures may be used as dictated by other processing considerations. It has been found that it is desirable to provide the carbon source in the vapor state, and thus, the pressure should not be so high as to cause the carbon source to be in the liquid state under fibril forming temperature conditions. Further, it is desirable although not essential to provide a suitable gaseous diluent, such as hydrogen or inert gases, for example, nitrogen.

It is preferred that the system as a whole be non-oxidizing wherefor preferably avoiding the presence of oxygen if practical. Small amounts of these materials can be tolerated. It should be understood that the existence of oxidizing conditions, at the elevated temperatures operative for this process, will cause oxidation of the carbon source and therefor reduce the amount of carbon from such source which is available for conversion into fibrils as desired.

It may be desirable to provide suitable heat to this reaction system where and when needed. Temperature of different parts of the reactor zone may be suitably controlled to different temperatures and this is easily accomplished by using electrical resistance heating. However in larger scale industrial practice, electric resistance heating may sometimes be economically replaced by direct heating, such as for example by burning some of the carbon contributing feed to raise the temperature of the remainder of the feed, or by feeding the catalyst or the carbon contributing feed, or the diluent into the system at a sufficiently elevated temperature such that direct heat exchange of the component with each other will cause the fibril forming reaction to proceed as desired.

The nature of the catalyst seems to have a significant effect upon the yield of fibrils produced according to this invention. It is known to use iron group metals such as iron, cobalt or nickel to catalyze the conversion of carbon contributing compounds to fibrils, and such metals are within the scope of this invention. In addition, many other multivalent transition metals, including lanthanides, appear to be operative. Particularly useful catalytic metals include inter alia: iron, molybdenum, cobalt, nickel, platinum, palladium, vanadium, and chromium. Of specific interest in this process are certain combinations of transition metals. Particularly useful combinations include iron and molybdenum, iron and chromium, copper and nickel, iron and platinum, iron and tin, iron and nickel, iron and manganese, and iron and cerium.

The yield of fibrils produced according to the practice of this invention appears to be related to the physical state of the catalyst used to produce such. According to this invention, it is important that the multivalent transition metal fibril forming catalyst be present on a suitable substrate as relatively discrete catalytic sites, each about 35 to 700 A preferably 60 to 300 A in size during fibril formation. These relatively discrete catalytic sites are produced by suitably applying the transition metal (in an appropriate state) to a substrate, suitably an inorganic substrate material which can include carbon/graphite.

The size of the substrate particle is a matter of some importance dependent upon the engineering of the process itself. For example, if the fibril formation is to take place in a fluid bed type of reaction zone, the substrate particle size will suitably be less than about 400 microns. If the fluid bed is an ebullient bed of catalyst particles, particle sizes of about 50 to 300 microns have been found to be preferable. If the fluid bed is an ebullient bed of fibrils containing small amounts of catalyst particles, i.e. up to about ten percent, these should preferably have a size of about 1 to 100 microns. If the fluid bed is a transport bed, either up flow or down flow, the catalyst carrying particles will suitably be less than about 10 microns, preferably less than about one micron.

It has been found that depositing one or more suitable transition metals on small particle substrates produces a catalyst well suited to use in this invention. The substrate is a material which can conveniently withstand the rigors of fibril formation conditions, e.g. temperatures of about 500° to 1500° C. Suitable substrates include carbon, graphite, inorganic oxides, etc. The particular substrate will be matched to the particular transition metal(s) catalyst such that the metal is bound strongly enough to retard migration and agglomeration but not so strongly as to prevent or retard the transition metal from catalyzing fibril formation. Illustrative, inorganic oxides include alumina, silica, magnesia, silicates, aluminates, spinels etc. Mixtures can be used.

Thus, very small particle iron, such as might be produced by decomposition of iron compounds, can be deposited on very small particle alumina, e.g. fumed alumina having particle sizes of no longer than about 100 mesh. These alumina particles may be made up of individual crystallites which are on the order of about 50 to 200 A, which agglomerate to form particles having substantial available surface area sufficient to receive deposits of appropriately sized transition metal catalyst.

The substrate particles are suitably less than about 300 microns. They may be less than 1 micron in transport bed use. It appears that the transition metal reacts with the substrate crystallites such as to bond the metal to the substrate and fix its position, so as to prevent or retard catalyst agglomeration, at least for so long as it takes to contact the supported transition metal with the suitable carbon source at appropriate reaction conditions. Upon contact, the carbon source seems to pyrolyze on the catalytic site and the desirable morphology fibril grows therefrom.

As noted, the state of the transition metal catalyst site during fibril formation is important to the practice of this invention. Sometimes, it appears that this desirable catalytic site state as well as the state of the substrate carrier therefore is changing during the whole process hereof. Thus, the catalytic sites may agglomerate or disperse to some extent during the period from introduction into the reaction zone until the fibrils made by the process are recovered. At the time the fibrils are recovered, particles of transition metal catalyst which are sometimes recovered with the fibrils are of about 35 to 700 A, preferably 60 to 300 A in size. Thus, it is believed that the size of the active catalyst site during fibril formation is substantially comparable to the diameter of the fibril being formed.

It appears that as fibril formation takes place, active catalyst sites become catalytically expended and need to be replaced. Additionally, it has been found that the fibril forming process is more efficient and capable of better control if the catalyst is added to the reaction zone intermittently or continuously over substantially the entire course of the reaction, or at least a substantial portion thereof. It is possible that the catalyst containing substrate of this invention may ablate with use. That is, when a fibril is formed on a particular catalytic site, that fibril and its associated site may break off from the substrate, with or without some of the substrate, thereby exposing further catalytic sites which were previously inside the substrate particle. Thus, periodic or continuous addition of fresh catalyst is desirable.

Thus, according to this invention, the fibril forming process hereof is preferably substantially continuous in that a suitable source of carbon, with or without carrier gas, and catalyst containing particles are continuously or intermittently fed to a reaction zone maintained at a fibril forming temperature appropriate to the carbon source being used; while fibril product, usually admixed with the remnants of the catalyst and sometimes substrate as well, are continuously or intermittently recovered.

The transition metal may be deposited on the substrate by any commonly used technique for accomplishing such deposition. Vapor deposition, sputtering and impregnation may all be suitable. In particular, it has been found to be expeditious to form a water solution or dispersion of the desired metal or metals, mix the water phase with appropriately sized substrate, and then precipitate the metal(s) onto the substrate, e.g. by evaporating the water or any other conventional means.

It is also within the scope of this invention to deposit the desired transition metal(s) from an organic (as opposed to aqueous) medium. Suitably the transition metal can be dissolved or suspended in such medium, for example, as an organometallic compound, and then impregnated onto and into a suitable substrate. The organic carrier medium is removed, leaving behind the impregnated, deposited transition metal.

After the transition metal is combined with the substrate as aforesaid, it may be important to treat this combination so as to activate it for this particular catalytic purpose, e.g., by heating it to separate the metal from other ligands, if any, in the deposition compound. It may also be necessary to adjust the size of the prepared catalyst to make it suitable for use in this invention. Comminution or agglomeration, e.g. by binding, may be desirable to produce particles of the proper size, i.e. of less than about 400 microns.

The catalyst of this invention may be put on the substrate hereof in any form or chemical oxidation state. It may be the oxide or have some other ligand. It may be reduced prior to use, but this is not necessary since the fibril forming reaction is a reducing environment and thus the transition metal will be reduced during, or immediately prior to, fibril forming use.

Fibrils which are very thin and long, diameters of about 3.5 to 70 nanometers and L/D up to 100 or more, are produced using these catalysts. These fibrils, as produced by this process, without the necessity of further treatment, and without the coproduction of a thermal carbon overcoat, comprise a carbon layer generally concentric about an axis which comprises multiple essentially continuous layers of ordered carbon atoms, which preferably and usually are crystalline and graphitic. This, as produced, outer layer of ordered carbon atoms often surrounds an inner layer of less ordered carbon atoms. Most preferred product of this invention are high yields of high quality, thin fibrils of appropriate long length having substantially uniform, concentric, substantially continuous, ordered, multiple layers of carbon about an axial (inner core) region, which has a different composition/crystallinity and is preferably hollow. Such fibrils preferably have up to about 100 times, and more greater length than diameter, have diameters of up to about 700 angstroms and are substantially cylindrical about a substantially hollow core and graphitic as made and without having been treated at higher temperatures than the original fibril manufacturing temperature.

According to one aspect of this invention, operating with catalyst particles as herein set forth, yields of fibrils of greater than about 30 times the weight of transition metal in the catalyst are achievable. In many cases, particularly with mixed transition metals, yields of between 100 and 200 times the weight of transition metal in the catalyst have been achieved. It has been found that in comparable processes, combinations of transition metal catalysts have sometimes increased yields by a factor of as much as 2 or even more.

The following examples illustrate the practice of this invention. By following one or more of these examples, high yields of unique fibrils as above described are produced.

EXAMPLE 1

A catalyst was prepared using Degussa fumed alumina with an average particle size of about 100 A and an aggregate mesh size of −100. Iron acetylacetonate was deposited on these alumina particles in a ratio of about 1 part iron, as the acetylacetonate, to 10 parts by weight of alumina. The resultant particles was heated under a hydrogen/ethylene atmosphere under reaction conditions.

A one (1) inch tube was heated to about 650° C. while it was being purged with argon. A mixed flow of hydrogen, at 100 ml/min, and ethylene, at 200 ml/min, was fed to the hot tube for five minutes whereupon catalyst was introduced into the reactor tube. The ethylene/hydrogen mixture was continued through the tubular reactor for 0.5 hours after which the reactor was allowed to cool to room temperature under argon. Harvesting of the fibrils so produced showed a yield of greater than 30 times the weight of the iron in the catalyst.

EXAMPLE 2

Into a 3 L. round bottom flask was added 80.08 g of Degussa fumed alumina and 285 ml of methanol. The mixture was stirred to produce a thick paste before a solution of 78.26 g (0.194 moles) of ferric nitrate nonahydrate and 4.00 g (0.0123 moles) of molybdenum(VI) oxide bis(2,4-pentanedionate) in 300 ml of methanol (Fe to Mo atom ratio of 94:6) was added slowly. The thick paste which had collected on the sides of the flask was washed down with 65 ml of additional methanol and the mixture was stirred for 1 hour before house vacuum (28 in. Hg) was applied while stirring overnight. The purple-tinted solid was placed in a vacuum (28 in. Hg) oven at 100° C. for 29 hours. A total of 110.7 g of catalyst was obtained. The catalyst was ground and passed through an 80 mesh sieve prior to use. Analysis of the catalyst indicated 9.43% by weight iron and 0.99% by weight molybdenum.

A vertical furnace containing a 1 inch quartz tube with an internal quartz wool plug and thermocouple was equilibrated at 650° C. under a down flow of 100 ml/min. hydogen and 200 ml/min. ethylene. Into the tube (onto the quartz wool plug) was added 0.1044 g of the above-described catalyst. After 30 min., the hydrogen/ethylene flow was stopped and the oven was allowed to cool to near room temperature. A total of 1.2434 g of fibrils was harvested for a yield ratio of 126 times the iron weight content of the catalyst.

EXAMPLE 3

A sample of catalyst from example 2 (1.6371 g) was paced in a horizontal furnace under argon and was heated to 300° C. After 30 min. at this temperature, the furnace was cooled and 1.4460 g of catalyst was recovered (12% wt. loss), having 11.1% by weight iron and 1.2% by weight molybdenum.

A vertical tube furnace containing a 1 in. quartz tube with an internal quartz wool plug and thermocouple was equilibrated at 650° C. under a 100 ml/min. down flow of hydrogen and 200 ml/min. down flow of ethylene. Into the hot tube was added 0.1029 g of the catalyst described above. After 30 min., the hydrogen/ethylene flow was stopped and the oven was allowed to cool to near room temperature under argon. A total of 1.3750 g of fibrils was isolated for a weight yield based on theoretical iron content of 120 times the iron content.

EXAMPLE 4

The vertical tube furnace described in Example 2 was equilibrated at 700° C. under the flow of 100 ml/min. hydrogen and 200 ml/min. propane. Onto the quartz wool plug was added 0.1041 g of catalyst from Example 2. After 30 min. the fuel gases were stopped and the product was cooled under argon. A total of 0.3993 of fibrils was isolated for a weight yield of 41 times the catalyst iron content.

EXAMPLE 5

The procedure of Example 4 was followed at 650° C. using 0.1004 g of catalyst from Example 2. A total of 0.3179 g of fibrils was harvested for a weight yield of 34 times the iron content of the catalyst.

EXAMPLE 6

Into a round bottom flask was added 4.25 g of Degussa fumed alumina and 30 ml of methanol. The mixture was mechanically stirred while a solution of 4.33 g (10.7 mmol) of ferric nitrate nonahydrate and 0.51 g (1.56 mmol) of molybdenum(VI)oxide bis(2, 4-pentanedionate) in 50 ml of methanol was slowly added. The mixture was stirred for 1 hour before the solvent was removed with the aid of a rotary evaporator. The resulting damp solid was vacuum dried at 105° C., 28 in. Hg for 18 hours. The resulting catalyst was ground and passed through an 80 mesh sieve. A total of 5.10 g of catalyst was obtained. Analysis of the catalyst indicated 9.04% by weight iron and 2.18% by weight molybdenum to be present.

Fibrils were prepared following the procedure of Example 2 at 650° C. using 0.0936 g of the above catalyst. A total of 0.9487 g of fibrils was isolated for a weight yield of 126 times the catalyst from content.

EXAMPLE 7

Into a round bottom flask was added 3.80 g of Degussa fumed alumina and 30 ml of methanol. The mixture was mechanically stirred while a solution of 4.33 g (10.7 mmol) of ferric nitrate nonahydrate and 2.04 g (6.25 mmol) of molybdenum(VI)oxide bis(2, 4-pentanedionate) in 100 ml of solvent was added. The mixture was held at 105° C. and 28 in. Hg for 17 hrs. The dried catalyst was sieved (80 mesh) to produce 6.10 g of powder. Analysis of the catalyst indicated 8.61% iron and 8.13% molybdenum by weight.

Fibrils were prepared following the procedure of Example 2 at 650° C. using 0.1000 g of the above catalyst. A total of 0.8816 g of fibrils was isolated for a weight yield of 102 times the catalyst iron content.

EXAMPLE 8

The procedure of Example 7 was followed at 700° C. using methane and 0.1016 g of catalyst. A total of 0.0717 g of fibrils was isolated for a yield of 8.2 times the iron content of the catalyst.

EXAMPLE 9

Into a 500 ml round bottom flask was placed 4.37 g of Degussa fumed alumina and 28 ml of methanol. To the stirred mixture was added a solution of 4.33 g (10.7 mmol) of ferric nitrate nonahydrate and 0.46 g (1.32 mmol) of chromium acetylacetonate in 75 ml of methanol. The mixture was stirred for 1 hr. before it was dried for 18 hr. at 105° C. and 28 in. Hg. The catalyst was ground and sieved (80 mesh) to produce 5.57 g of powder. The theoretical metal content by weight was 11.9% iron and 1.4% chromium.

Fibrils were prepared following the procedure of Example 2 at 650° C. using 0.0976 g of the above catalyst. A total of 0.9487 g of fibrils was isolated for a yield of 82 times the theoretical iron content.

EXAMPLE 10

Into a 500 ml round bottom flask was placed 4.40 g of Degussa fumed alumina and 35 ml of methanol. To the thick paste was added 4.32 g (10.7 mmol) of ferric nitrate non-ahydrate in 35 ml of methanol. The mixture was stirred for 45 min. before the solid was dried at 95° C. and 28 in. Hg for 18 hr. The catalyst was ground and sieved (80 mesh).

Fibrils were prepared following the procedure of Example 2 at 650° C. using 0.0930 g of the above catalyst. A total of 0.4890 g of fibrils was isolated for a weight yield of 46 times the catalyst iron content.

EXAMPLE 11

Into a round bottom flash was placed 4.33 g of Degussa fumed alumina in 30 ml of methanol. To the stirred paste was added a solution of 4.33 g (10.7 mmol) of ferric nitrate nonahydrate and 0.42 g (1.19 mmol) of ferric acetylacetonate in 50 ml of methanol. The mixture was stirred for 75 min. before drying at 105° C. and 28 in. Hg for 17 hrs. The solid was ground and sieved (80 mesh) to yield 5.87 g of catalyst. Analysis showed 13.79% iron present in the catalyst.

Fibrils were prepared following the procedure of Example 2 at 650° C. using 0.0939 g of the above catalyst to produce 0.3962 g of fibrils. This corresponds to 31 times the iron content of the catalyst.

EXAMPLE 12

Into a round bottom flask was added 4.33 g of Degussa fumed alumina in 20 ml of water followed by a solution of 4.33 g (10.7 mmol) of ferric nitrate nonahydrate and 0.17 g (0.138 mmol) of ammonium molybdate in 40 ml of water. The mixture was mechanically stirred for 1 hour. The water was removed at reduced pressure at 40° C. overnight. Final drying was accomplished at 140° C. and 26 mm. Hg for 21 hours to produce 5.57 g of solid. Analysis of the catalyst showed 9.87% by weight iron and 1.45% by weight molybdenum to be present.

Fibrils were prepared following the procedure of Example 2 at 650° C. using 0.0794 g of catalyst to produce 0.8656 g of fibrils. This corresponds to 111 times the iron content of the catalyst.

EXAMPLE 13

Into a round bottom flask, containing 4.33 g of Degussa fumed alumina and 30 ml of methanol, was added a solution of 4.33 g (10.7 mmol) of ferric nitrate nonahydrate and 0.16 g (0.368 mmol) of ceric nitrate in 50 ml of methanol. An additional 20 ml of methanol was used to wash all the salts into the flask. The mixture was stirred for one hour before the solvent was removed at reduced pressure. The solid was dried at 130° C. and 27 mm Hg for four days to produce 5.32 grams of catalyst. Analysis of the solid indicated 9.40% iron and 0.89% cerium to be present.

Fibrils were prepared following the procedure of Example 2 at 650° C. using 0.0941 g of catalyst to produce 0.7552 g of fibrils. This corresponds to 88 times the iron content of the catalyst.

EXAMPLE 14

Into a round bottom flask was added 4.33 g of Degussa fumed alumina and 30 ml of methanol. Onto the alumina was poured a solution of 4.33 g (10.7 mmol) of ferric nitrate and 0.31 g (1.22 mmol) of manganese(II) acetylacetonate in 50 ml of methanol. The solvent was removed at reduced pressure (27 mm Hg) and the damp solid was vacuum dried at 140° C. to produce 5.18 g of solid. Analysis of the catalyst indicated 9.97% iron and 1.18% manganese.

Fibrils were prepared following the procedure of Example 2 at 650° C. using 0.070 g of catalyst to produce 0.4948 g of fibrils. This corresponds to 66 times the iron content of the catalyst.

EXAMPLE 15

Into a round bottom flask was added 4.33 g of Degussa fumed alumina and 30 ml of methanol. Onto the alumina was poured a solution of 4.33 g (10.7 mmol) of ferric nitrate and 0.43 g (1.22 mmol) of manganese(III) acetylacetonate in 50 ml of methanol. The solvent was removed at reduced pressure and the damp solid was vacuum dried at 140° C. to produce 5.27 g of solid. Analysis of the catalyst indicated 10.00% iron and 1.18% manganese by weight.

Fibrils were prepared following the procedure of Example 2 at 650° C. using 0.0723 g of catalyst to produce 0.7891 g of fibrils. This corresponds to 110 times the iron content of the catalyst on a weight basis.

EXAMPLE 16

Degussa fumed alumina (400 g) and deionized water (8.0 L) were added to a 22 L flask equipped with a stirrer, pH meter and probe, and two 2 L addition funnels. One funnel contained an aqueous solution of ferric nitrate nonahydrate (511 g dissolved in 5654 ml of water) and the other an aqueous solution of sodium bicarbonate (480 g dissolved in 5700 ml of water).

The pH of the alumina slurry was first adjusted to 6.0 by adding the sodium bicarbonate solution to raise it or the ferric nitrate solution to lower it. Next, both solutions were added simultaneously over 3–4 hours with good agitation while maintaining the pH at 6.0. When the addition was complete, stirring was continued for an additional ½ hour, after which the slurry was filtered on a 32 cm Buchner funnel. The filter cake was then washed with deionized water and returned to the 22 L flask. Next, additional deionized water was added and the slurry stirred for another ½ hour. The batch was then filtered, washed with deionized water, and vacuum-dried at 100° C. to constant weight (475 g). Following drying, the final catalyst was prepared by grinding and sieving the product to −80 mesh.

EXAMPLE 17

This Example illustrates the practice of this invention using periodic addition of catalyst to produce high fibril yields. A four-inch quartz tube, closed on the bottom, was placed in a 4 inch diameter×24 inch long furnace. The tube was purged with argon while being heated to 620° C. When the tube was hot, the gas feed was switched to a mixture of hydrogen (1.0 l/min) and ethylene (5.6 l/min) via a dip tube to the bottom of the 4 inch tube. After 5 min of purging, the catalyst addition was begun.

A total of 41.13 g of catalyst, prepared as described in the Example 16, was added to the hot reactor reservoir. The catalyst was added periodically to the hot reactor in small portions (0.2 g) over a period of approximately 6 hours. After catalyst addition was complete, the reaction was allowed to run for an additional one hour and the reactor then cooled to room temperature under argon. The fibrils were removed from the tube and weighed. This batch gave 430 g total yield of fibrils which is unusually high for a catalyst based upon iron has the only transition metal. In single batch addition of an iron only catalyst, fibril yields of about 30 times the iron content have been observed whereas here the fibril yield is more than 70 times the iron content of the catalyst.

EXAMPLE 18

The tube and furnace described in Example 17 were heated to 650° C. under an argon purge. When the tube was hot the gas feed was switched to hydrogen and ethylene as described in Example 17.

A total of 20.4 g of catalyst (Fe-Mo) prepared as described in Example 2 was added in a manner similar to that described in Example 17. This batch gave a total fibril yield of 255 g.

EXAMPLE 19

A stream consisting of recycle and make-up CO is fed into a brick-lined flow tower reactor (diameter=0.30 meters, height=20 meters) along with the catalyst prepared as described in example 2. The mixed recycle and make-up CO stream enters the tower at the top and flows down through ceramic strip heaters which bring its temperature to 1100° C. The catalyst is fed by a star feeder into the CO stream.

Gas flow through the reaction zone is 0.16 m/sec and the zone is approximately 10 meters long. The reaction may be terminated by the injection of cold (100° C.) gas. Product fibrils are collected on a porous ceramic filter and the effluent gas is recompressed to about 1.3 atmospheres. A small purge is taken from the effluent gas to balance unknown impurities formed in the reactor and contained in the feed CO. The stream passes through a KOH bed (0.5 m diameter×2 m long) before the make-up CO is added. The stream then is divided, with 9 g/second being diverted through a heat exchanger and the remaining 3 g/second returning to the reaction tower.

After 3 hours, the system is shut down and cooled and the ceramic filter is removed. The carbon fibrils are obtained matted to the filter.

We claim:

1. In the process of producing carbon fibrils by decomposing a source of carbon at elevated temperatures in contact with a multivalent transition metal and recovering the fibrils formed thereby; the improvement which comprises injecting catalyst particles having a size of up to 400 microns and comprising at least one multivalent transition metal on a particulate substrate into a reactor heated to a temperature below the thermal decomposition temperature of said source of carbon, and continuously recovering the fibrils formed thereby, said metal being present on said substrate as a multiplicity of discontinuous catalytic sites which, at least during fibril formation, have a size of about 35 to 700 A which size is measured by measuring the size of transition metal particles recovered along with produced fibrils and said fibrils comprising an inner core region of less ordered carbon atoms surrounded by an outer region of ordered carbon atoms.

2. The improved process of claim 1 wherein said transition metal comprises iron with a catalyst site size of about 60 to 300 A.

3. The improved process of claim 1 wherein said transition metal is iron mixed with at least one other transition metal and said transition metals are present in an amount less than about 25 wt. %.

4. The improved process of claim 3 wherein said other transition metal is at least one selected from the group consisting of molybdenum and chromium.

5. The improved process of claim 1 wherein said carbon source is a mixture of hydrocarbons.

6. The improved process of claim 1 wherein said carbon source is at least one member selected from the group consisting of methane, ethane, propane, butane, benzene, butene, isobutene, cyclohexane, ethylene, propylene, acetylene, toluene, xylene, cumene, ethyl benzene, naphthalene, phenanthrene, anthracene, formaldehyde, acetaldehyde, acetone, methanol, ethanol, and carbon monoxide.

7. The improved process as claimed in claim 1 carried out in an ebulliating bed wherein said catalyst particles have a particle size of about 50 to 300 microns.

8. The improved process as claimed in claim 1 carried out in an transport bed wherein said catalyst particles have a particle size of less than about 10 microns.

9. The improved process of claim 8 wherein said catalyst particles have a particle size of less than about 1 micron.

10. The improved process of claim 1 including physically cofeeding said catalyst particles and said source of carbon downflow through a reaction zone.

11. The improved process of claim 1 including physically cofeeding said catalyst particles and said source of carbon upflow through a reaction zone.

12. The improved process of claim 1 including cofeeding a non-hydrocarbonaceous gas with said carbon contributing feed.

13. The improved process of claim 1 including dispersing said catalyst particles throughout the volume of the reactor.

14. The improved process of claim 1 wherein said catalyst particles are added to the heated reactor over the course of the reaction.

15. The improved process of claim 14 wherein said catalyst particles are added intermittently over the course of the reaction.

16. The improved process of claim 1 wherein said source of carbon is added to the heated reactor.

17. The improved process of claim 1 wherein said source of carbon is added to the heated reactor over the course of the reaction.

18. The improved process of claim 1 wherein said catalyst particles and said source of carbon are added to the heated reactor over the course of the reaction.

19. The improved process of claim 1 carried out at a temperature between about 500° and 1500° C.

20. The improved process of claim 1 including recovering a high yield of product comprising carbon fibrils characterized as tubes that are substantially free of pyrolytically deposited thermal carbon and have graphitic layers that are substantially parallel to the fibril axis.

21. The improved process of claim 1 wherein the diameter of said fibrils is between 3.5 and 70 nanometers, inclusive.

22. The improved process of claim 1 wherein said process is carried out in a fluidized bed.

23. A process for producing high yields of long, thin fibrils comprising at least long portions having atomically ordered outer surfaces, as made by contacting a vaporous source of the atoms which will comprise said outer surface with catalytic particles; which process comprises injecting said catalyst particles into a reactor heated to a temperature below the thermal composition temperature of said source of carbon, said catalyst particles having a size of up to 400 microns and comprising at least one multivalent transition metal on a particulate substrate, said metal being present on said substrate as multiplicity of discontinuous catalytic sites which, at least during fibril formation, have a size of about 35 to 700 A which size is measured by measuring the size of transition metal particles recovered along with produced fibrils, and continuously recovering the fibrils formed thereby.

* * * * *